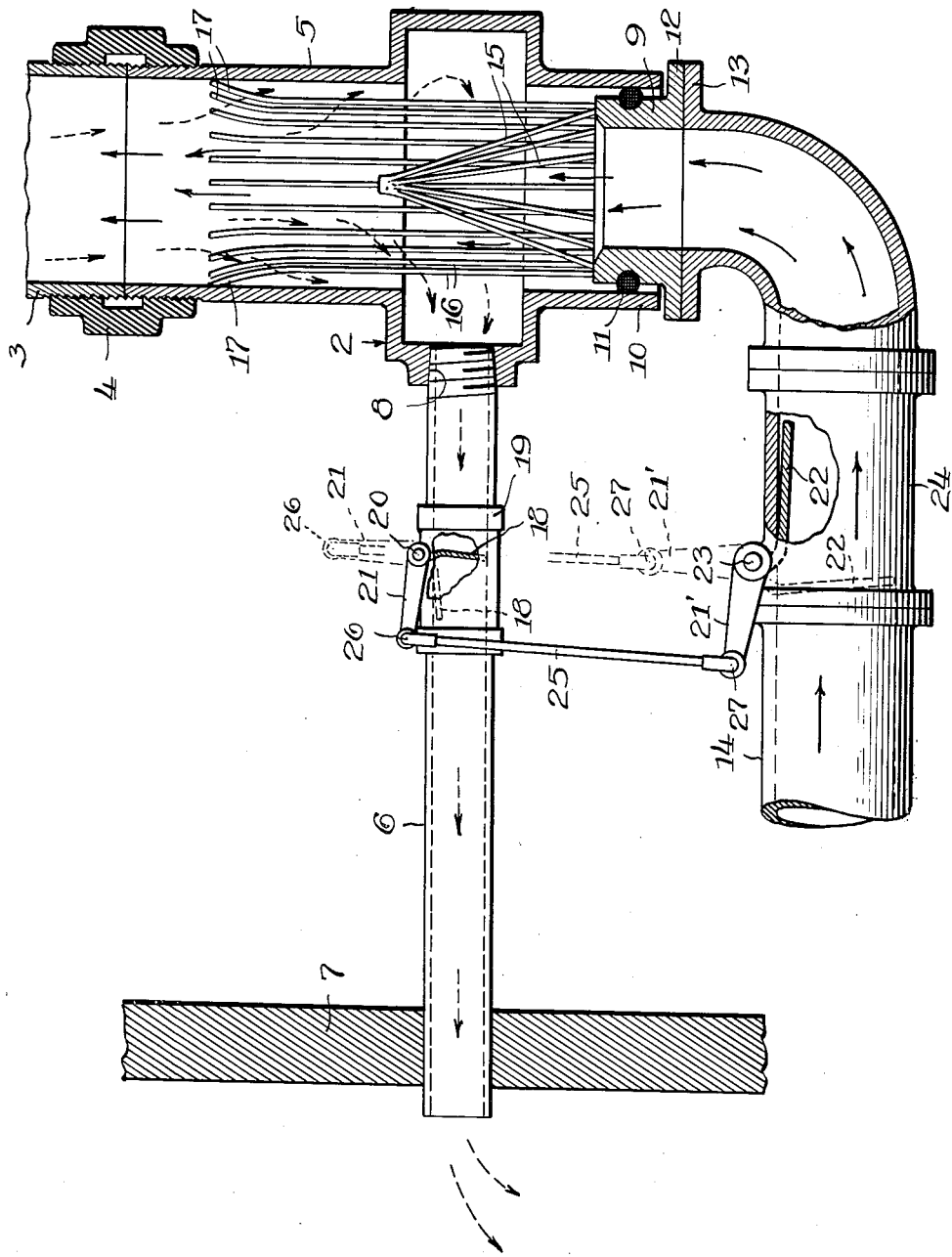

United States Patent Office 3,063,566
Patented Nov. 13, 1962

1

3,063,566
STRAINER

William M. Hanley, Chicago, Ill., assignor to FMC Corporation, a corporation of Delaware Filed June 25, 1959, Ser. No. 822,820
4 Claims. (Cl. 210—411)

This invention relates to a strainer adapted to retain solids screened from the sewage inflow to a wet well during the inflow cycle, and is particularly concerned with means for preventing the strainer from becoming clogged.

The strainer may be used in many different fields, but is specifically designed for sewage inflow into a wet well from which the sewage liquid is pumped when the liquid level attains a predetermined height, and will be described in connection with said use.

In sewage systems provided with a wet well for the accumulation of liquid sewage a common conduit is connected to an inlet conduit for permitting the flow of sewage to the wet well in which a pump is located, and to a discharge conduit leading from the pump. The inlet and discharge conduits are each provided with a check valve interconnected by linkage that keeps one valve closed whenever the other is open. A strainer is located in the common conduit in position so that all the liquid flowing in either direction must pass through the strainer. The solids intercepted by the strainer, particularly rags or paper having a high wet strength, tend to clog the strainer, and thereby impair or block the flow of liquid into the wet well. The liquid discharge from the pump passes through the strainer in the opposite direction and carries the intercepted solids with it to the discharge outlet.

In accordance with the present invention a strainer housing connects the common conduit to the inlet and discharge conduits. The opening in the strainer housing connected to the discharge conduit is at a lower level than the opening connected to the inlet conduit so that a considerable accumulation of solids may be retained by the strainer without interfering with the inflow of screened liquid to the wet well. The strainer comprises a plurality of circumferentially space bars inclined in conical form to retain the solids, and a plurality of bars of greater height adapted to guide solids to the conical portion of the strainer. The longer bars permit the liquid to flow therebetween, but prevent any solids from flowing with the liquid into the inlet. The longer bars extend above the conical portion of the strainer a sufficient distance so that the strainer is effective to let the screened liquid flow into the inlet even when the solids extend above the apex of the conical portion of the strainer.

During the inflow cycle the pressure of the inflowing sewage forces the inlet valve into open position and holds it in such position. The linkage between the inlet and discharge valves holds the discharge valve in closed position during the inflow cycle. The pump is idle while the screened liquid is flowing into the wet well, and there is no pressure against the discharge valve tending to move it to its open position. When the liquid level in the wet well attains a predetermined height it actuates the pump, and the pressure of the discharge from the pump forces the discharge valve into its open position. The movement of the discharge valve to its open position causes the linkage to close the inlet valve, thereby stopping the inflow of liquid into the wet well.

The pump pressure of the discharge is greater than the pressure of the inflowing liquid, and is effective to close a valve (not shown) in the inflow conduit above the common conduit so that during the operation of the pump only discharge liquid flows through the common conduit. When the liquid level in the wet well recedes to a predetermined low point, the pump is stopped automatically, and the inflow again flows through the common conduit to the wet well.

2

The structure by means of which the above-mentioned and other advantages of the invention are attained will be described in the following specification, taken in conjunction with the accompanying drawing, showing a preferred illustrative embodiment of the invention, in which:

The single figure is a fragmentary view, partly in section and partly in elevation, of a flow system for liquid sewage embodying the invention.

Referring to the drawing, the reference numeral 2 indicates a strainer housing secured to one end of a common conduit 3 in any suitable manner, as, for example, by a union 4 threaded on the end of a cylindrical neck 5 projecting upwardly from housing 2, and the lower end of conduit 3. An inlet conduit 6 extending through one wall 7 of a wet well has its other end secured in an opening 8 in housing 2. The end of conduit 6 is preferably threaded into opening 8, but it may be secured in any other suitable manner. A cylindrical collar 9 is sealed in the open end of a neck 10 extending from the bottom of housing 2 by a compressible sealing ring 11. The lower edge of collar 9 is provided with a laterally extending annular flange 12 which abuts a similar flange 13 on one end of a discharge conduit 14 to which it is secured. Discharge conduit 14 includes the discharge casing of a pump (not shown) which may be located in either the wet or dry well, as is well known.

The upper edge of collar 9 is located in a plane below opening 8 and provides support for the lower ends of strainer bars 15 and 16 which may be embedded therein. Strainer bars 15 are spaced circumferentially of collar 9 and are inclined to form a cone. Strainer bars 16 are also spaced circumferentially of collar 9 and extend upwardly in the form of a cylinder. The upper ends of strainer bars 16 are curved outwardly above the apex of conically arranged bars 15 to engage the inner surface of neck 5, as indicated at 17. The conical arrangement of strainer bars 15 is not critical, but is preferred because it provides a convenient surface for the removal of intercepted solids by the liquid discharge pumped upwardly through the strainer housing, as hereinafter described.

A check valve 18, having a surface area conforming to the cross sectional area of a coupling 19 interposed in inlet conduit 6 is positioned in the coupling and is rigidly secured to a pivot pin 20 positioned exteriorly of the coupling. An arm 21 positioned exteriorly of conduit 6 and coupling 19 is rigidly secured at one end to pivot pin 20 so as to move pivotally with valve 18 as the valve is rocked between open and closed position. A second check valve 22 is similarly pivoted, as indicated at 23, adjacent a coupling 24 interposed in discharge conduit 14. An arm 21', similar to arm 21, is rigidly secured at one end to pivot pin 23 to move pivotally with valve 22. A link 25, which may be adjustable, if desired, is pivotally connected at one end to arm 21, as indicated at 26, and at its other end to arm 21', as indicated at 27. Link 25 is offset to clear conduits 6 and 14.

The linkage interconnecting valves 18 and 22 causes one of the valves to move to closed position automatically when the other valve is moved to open position. During the inflow cycle, liquid sewage, with solids contained therein, flows downwardly through conduit 3 into housing 2. The solids are intercepted by screen bars 15 or 16. The bent ends of bars 16 prevent solids from passing between the outside of the bars and the inner surface of housing 2. Since bars 16 are substantially vertical, the solids will be washed down until they engage the conically arranged screen bars 15, which protect the opening in collar 9 that leads to discharge conduit 14. The intercepted solids tend to slide down along bars 15 or 16, and become lodged in the space between bars 15 and 16, adjacent the bottom of the strainer. As the solids accumulate, they build up in the space between bars 15 and 16, thereby filling the spaces between bars 16. The intercepted solids may build up a solid barrier above the conically arranged screen bars 15 but will be spaced from the inner walls of neck 5 as along as the solids are not built up to the upper edge of the strainer.

As long as the solids are spaced from the inner wall surface by bars 16, the liquid will continue to flow between screen bars 16 and into conduit 6. As the liquid flows through coupling 19 it will force valve 18 into open position and the liquid will by-pass the pump and flow directly into the wet well. This arrangement permits greater inflow because it eliminates all the friction losses through the pump and its associated piping. As valve 18 is moved into open position the linkage between it and valve 22 moves valve 22 into closed position. During the inflow cycle the pump (not shown) connected to discharge conduit 14 is idle, and there is no pressure against valve 22. When the liquid level in the wet well reaches a predetermined high level, the pump is automatically actuated, and the liquid pumped from the wet well flows through conduit 14, exerting pressure against valve 22 to move it to open position so that the discharge liquid can pass upwardly through housing 2 to a discharge outlet. The opening movement of valve 22 moves valve 18 to closed position, thereby closing the inlet to the wet well. When the liquid level in the wet well recedes to a predetermined low level, the pump is automatically stopped and the liquid flow into the wet well starts. Preferably the inflow conduit above conduit 3 is provided with a check valve (not shown) which is closed by the pressure of the liquid discharge pumped through conduit 3 to prevent flow of sewage from the inlet into conduit 3 during the discharge cycle.

As the discharge liquid is forced through housing 2 by the pump pressure, it flows upwardly through the spaces between strainer bars 15 and carries the intercepted solids with it to the discharge outlet. In this manner the strainer is cleaned during each discharge cycle. The strainer is so dimensioned that the solids intercepted by the strainer during a single inflow cycle cannot stack up high enough to close neck 5 of the strainer housing. There is always space between the intercepted solids and the inner wall surface of neck 5 for the liquid of the inflowing sewage to pass through strainer housing 2 and into the wet well.

Although I have described a preferred embodiment of the invention in considerable detail, it will be understood that the description is intended to be illustrative, rather than restrictive, as many details may be modified or changed, without departing from the spirit or scope of the invention. Accordingly, I do not desired to be restricted to the exact construction described.

I claim:

1. In a sewage flow system, a housing having three openings, a common conduit for the flow of liquid in opposite directions having one end secured to one of said openings, a second conduit having one end secured to the second of said openings, said second conduit providing a passageway for strained liquid flowing from said housing, a third conduit having one end secured to said third opening, a valve in said second conduit, a second valve in said third conduit, linkage connecting said valves, said linkage being operable to move either of said valves to closed position in response to movement of said other valve to open position, and a strainer in said housing, said strainer comprising means for intercepting solids from sewage flowing from said common conduit through said housing and second conduit, and for holding said intercepted solids spaced from the inner wall surface of said housing, to provide a passageway for the flow of liquid through said housing, around the intercepted solids, and into said second conduit, said third conduit providing a passageway for strained liquid flowing into said housing to backwash said strainer and carry the intercepted solids through said common conduit.

2. In a sewage flow system, a housing having three openings, a common conduit for the flow of liquid in opposite directions having one end secured to one of said openings, a second conduit having one end secured to the second of said openings, a third conduit having one end secured to said third opening, a valve in said second conduit, a second valve in said third conduit, linkage connecting said valves, said linkage being operable to move either of said valves to closed position in response to movement of said other valve to open position, and a strainer in said housing, said strainer comprising a plurality of strainer bars spaced circumferentially of said housing in spaced relationship to the inner wall surface of said housing, the upper ends of said bars extending outwardly into contact with said inner wall surface above said second opening to prevent passage of solids through the spaces between said bars, and a plurality of conically arranged strainer bars having their lower ends spaced circumferentially of said housing within the circle of said first mentioned strainer bars and surrounding said third opening to retain solids intercepted by said strainer in spaced relationship to the inner wall surface of said housing above said third opening, said first mentioned strainer bars providing a passageway for the flow of liquid from said common conduit through said housing and into said second conduit, the flow of liquid through said third conduit being effective to remove said intercepted solids from said strainer and carry them with said liquid to a discharge outlet.

3. In a sewage flow system, a housing having three openings, a common conduit for the flow of liquid in opposite directions having one end secured to one of said openings, a second conduit having one end secured to the second of said openings, a cylindrical collar secured in said third opening, a third conduit having one end fixed to said collar, a valve in said second conduit, a second valve in said third conduit, linkage connecting said valves, said linkage being operable to move either of said valves to closed position in response to movement of said other valve to open position, and a strainer in said housing, said strainer comprising a plurality of strainer bars extending upwardly from said collar, said strainer bars being spaced circumferentially of said collar in spaced relationship to the inner wall surface of said housing, the upper ends of said bars extending outwardly into contact with said inner wall surface above said second opening to prevent passage of solids through the spaces between said bars, and a plurality of conically arranged strainer bars extending upwardly from said collar and having their lower ends spaced circumferentially of said housing within the circle of said first mentioned strainer bars and surrounding said third opening to retain solids intercepted by said strainer in spaced relationship to the inner wall surface of said housing above said third opening, said first mentioned strainer bars providing a passageway for the flow of liquid from said common conduit through said housing and into said second conduit, the flow of liquid through said third conduit being effective to remove said intercepted solids from said strainer and carry them with said liquid to a discharge outlet.

4. In combination with a housing having an opening, a conduit connected to said opening, said conduit providing a passageway for strained liquid flowing from said housing, a second opening below the lowermost edge of said first mentioned opening, a second conduit connected to said second opening, said second conduit providing a passageway for strained liquid flowing into said housing, a valve in each of said conduits, means interconnecting said valves for moving either of them to closed position when said other valve is moved to open position, and a strainer in said housing, a third opening at the upper edge of said housing, a common conduit for the flow of liquids in opposite directions having one end secured to said third opening, said strainer extending upwardly from said second opening to a level above the upper edge of said first mentioned opening, said strainer being effective to retain solids intercepted thereby in spaced relationship to the inner wall surface of said housing whereby liquid may flow through said strainer into said first mentioned conduit, liquid from said second conduit flowing through said strainer to remove said intercepted solids from said strainer and carry them through said common conduit to a discharge outlet.

References Cited in the file of this patent

UNITED STATES PATENTS

| | | |
|---|---|---|
| 2,184,618 | Lawlor | Dec. 26, 1939 |
| 2,278,178 | Lannert | Mar. 31, 1942 |
| 2,358,841 | Walker | Sept. 26, 1944 |
| 2,569,748 | De Grave | Oct. 2, 1951 |
| 2,754,097 | Hjulian | July 10, 1956 |

FOREIGN PATENTS

| | | |
|---|---|---|
| 126,586 | Great Britain | May 15, 1919 |